Nov. 17, 1970   A. P. URBUTIS   3,540,076

PILOT DEVICE

Filed Oct. 29, 1968

INVENTOR
ALGIMANTAS P. URBUTIS
BY
John Hohmann
ATTORNEY

United States Patent Office 3,540,076
Patented Nov. 17, 1970

3,540,076
PILOT DEVICE
Algimantas P. Urbutis, Chicago, Ill., assignor to Union Carbide Corporation, a corporation of New York
Filed Oct. 29, 1968, Ser. No. 771,552
Int. Cl. A22c 13/00
U.S. Cl. 17—45                                             12 Claims

ABSTRACT OF THE DISCLOSURE

A pilot device is disposed on a shirring mandrel in close proximity to a shirring head for guiding an inflated sausage casing advancing on the mandrel into a zone of shirring. The pilot device has a guiding portion defined by a plurality of surfaces circumferentially spaced about the mandrel. These surfaces support the inside wall of the advancing casing, shape the casing and guide it to a predetermined position with respect to the mandrel immediately before the casing enters the shirring zone.

---

The present invention relates to the production of shirred sausage casings and, more particularly, to a method and apparatus for shirring a continuous length of extruded tubing which is used as a sausage casing.

Edible sausage casings have recently been developed which are manufactured from protein sources such as collagen. A very thin-walled edible collagen casing may be obtained by preparing a pasty mass of swollen collagen, extruding it into a continuous tubing, collapsing the extruded tubing and treating it in neutralizing and plasticizing baths. The treated collagen tubing is then inflated, dried to size and thereafter is shirred on a mandrel, severed into predetermined lengths and compressed into sticks. These casing sticks are later used by the meat packer. In the steps of making sausages, the casing is placed on a stuffing horn, filled with sausage emulsion, and the filled casing is then formed into sausage links. The collagen casings are cookable, as well as tender and edible with the sausage emulsion contained therein.

However, processing collagen casing is a delicate operation presenting several problems because during said processing the collagen tubing is very fragile, weak and porous. The sizing, drying and shirring operations are usually performed as a continuous process and the inflating gas, i.e., air, for example, is most readily supplied to the tubing for the sizing and drying steps through the hollow shirring mandrel used in said continuous process. Because the freshly treated tubing is fragile, weak and somewhat elastic, the inflating air must be maintained at a very low pressure. The preferred pressure is that which is just sufficient to maintain the inflated tubing at the desired size during the drying step and to compensate for the leakage of air through the porous wall of said tubing.

Inflating a tubing from a hollow mandrel is well known in the art of shirring regenerated cellulose tubing which is inflated in order to impart to the tubing wall the amount of rigidity and stiffness necessary for advancing the tubing over the mandrel concentrically with said mandrel and to permit shirring members disposed concentrically about said mandrel to grip the advancing tubing and to form pleats therein. The rigidity and stiffness of the tubing wall are important factors in the shirring operation, affecting the character and uniformity of the pleats and the compression of the shirred tubing into a compact casing stick. The form of the pleats to a large extent affects the compression factor and the cohesion and integrity of the casing stick. A tightly compressed shirred casing stick is desirable for satisfactory handling and shipping of the stick. The pressure of the air inflating a regenerated cellulose tubing may be between about 100 in. water column and about 220 in. water column, depending on several variables such as, for example, the speed of advance of the tubing over the shirring mandrel, or the type of members employed to effect the shirring as is well known to those skilled in the art.

After an extruded collagen tubing has been treated in neutralizing and plasticizing baths, it is usually inflated to low gas pressures, as low as, for example, about 1 in. water column, to maintain it at the desired size during the drying operation as above explained. While this low inflating pressure is satisfactory for the sizing and drying steps, it does not impart to the collagen tubing the physical characteristics of rigidity and stiffness obtained with the high inflating pressures used in the shirring of regenerated cellulose tubing. The softly inflated collagen tubing is limp and lacks rigidity which makes the shirring step more difficult than in the case of regenerated cellulose tubing. One of the most serious difficulties encountered in shirring a tubing inflated at such a low pressure lies in the problem of centering said tubing about the mandrel. The limp collagen tubing tends to droop and to be eccentrically displaced with respect to the shirring mandrel and thus with respect to the shirring members which, as above explained, adversely affects the character and uniformity of the pleats. The compression of an unsatisfactorily shirred length of tubing produces a stick which is not compact enough and, therefore, is difficult to handle and to package for shipment to the sausage manufacturers.

It is an object of the present invention to provide a new method for shirring a tubular sausage casing in which a continuous length of inflated tubing is guided into the zone of shirring in such a manner as to permit the shirring members to form regular pleats in the wall of the tubing.

It is another object of the present invention to provide a pilot device for placing an inflated sausage casing advancing on a shirring mandrel in any desired position with respect to said mandrel, for example, for placing the advancing casing in a position concentric to the mandrel, and for guiding into a zone of shirring the so positioned casing.

It is a further object of the present invention to provide an improvement in an apparatus for shirring sausage casing consisting of a casing guiding device disposed on a shirring mandrel in close proximity to a shirring head between the feed end of the mandrel and said shirring head.

The foregoing and additional objects will become more fully apparent from the following description and the accompanying drawing in which.

Figure 1:
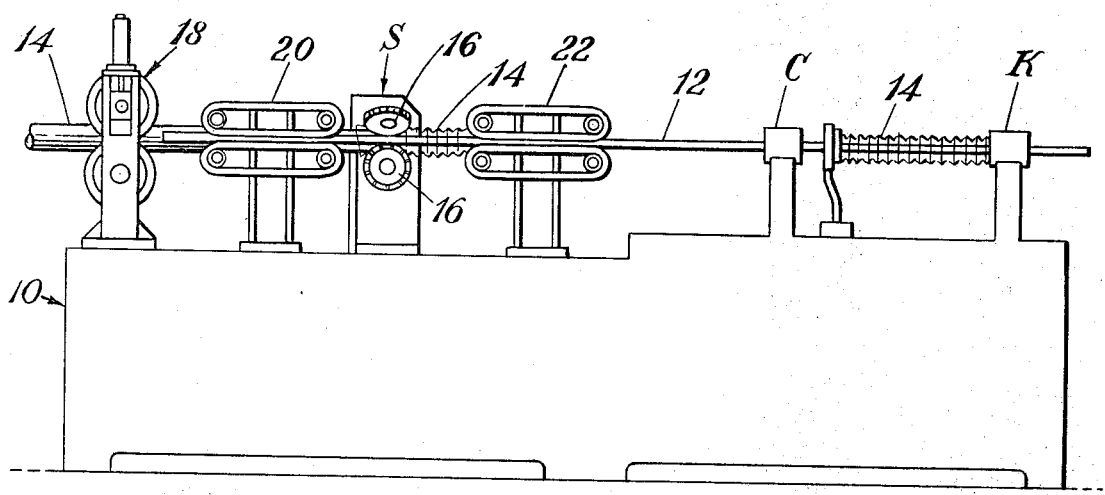
FIG. 1 is a schematic side elevation view of a shirring apparatus provided with a pilot device as shown in FIG. 2.
Figure 2:
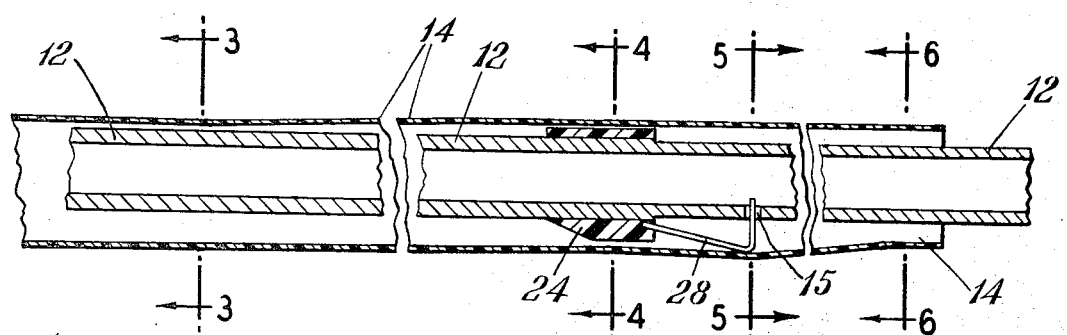
FIG. 2 is an enlarged cross-sectional view partially broken away of the feed end portion of the shirring mandrel shown in FIG. 1 and provided with a pilot device according to an embodiment of the invention.
Figure 3:
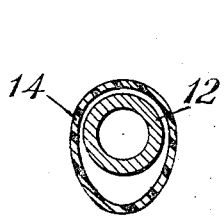
Figure 4:
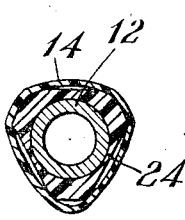
Figure 5:
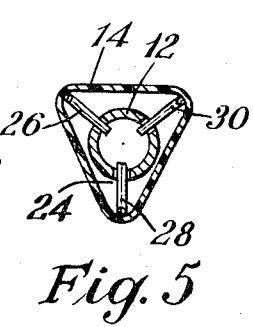
Figure 6:
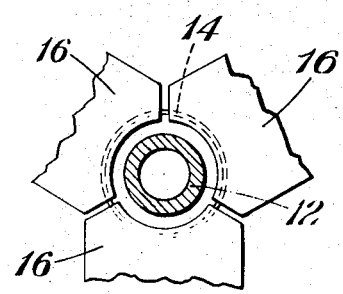
Figure 7:
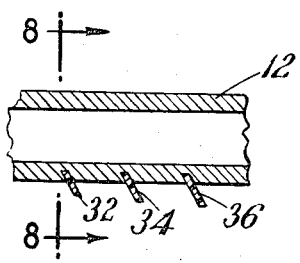
Figure 8:
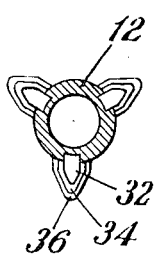

FIGS. 3, 4 and 5 are vertical cross-sections of the mandrel taken along lines 3—3, 4—4 and 5—5, respectively, of FIG. 2, looking in the direction of the arrows;

FIG. 6 is a vertical sectional view of the mandrel with portions of three shirring wheels of the shirring head of FIG. 1 taken through their centers of rotation with the arcuate edge surface of the wheels in gripping engagement with the inflated casing;

FIG. 7 is an enlarged fragmentary cross-sectional view of the shirring mandrel shown in FIG. 1 and provided with a pilot device according to another embodiment of the invention; and FIG. 8 is a vertical cross-section of the mandrel taken along line 8—8 of FIG. 7 looking in the direction of the arrows.

According to the invention, there is provided a method of shirring a tubular sausage casing, wherein an inner wall of a continuous length of inflated tubing advancing over a shirring mandrel is supported internally and peripherally urged in spaced apart relationship with respect to the circumference of the mandrel, and is guided to a predetermined position with respect to the mandrel immediately before said tubing enters the zone of shirring, and the so guided tubing is then shirred.

The present invention also provides an apparatus for shirring a sausage casing comprising a hollow shirring mandrel provided with means for inflating a sausage casing in the form of a continuous tubing and a shirring head comprising a plurality of shirring members disposed about said mandrel. The inflated tubing is fed over the mandrel and advances to and through the shirring head. The shirring apparatus of the invention has a tubing pilot device disposed on the mandrel between the tubing feed end thereof and the shirring head. The device is preferably positioned in close proximity to the shirring head. The pilot device comprises a resilient guiding portion which supports the inside wall of the advancing inflated tubing in spaced apart relationship with respect to the circumference of the mandrel immediately before said tubing enters the zone of shirring at at least three points circumferentially spaced from each other in a plane transverse to the longitudinal axis of the mandrel. The perimeter of the resilient guiding portion is greater than the internal circumference of the inflated tubing advancing thereover. The guiding portion of the device is preferably defined by at least three surfaces circumferentially spaced about the mandrel and more preferably by at least three surfaces circumferentially spaced from each other in a plane transverse to the longitudinal axis of the mandrel and attached to said mandrel in spaced apart relationship therewith. The surfaces defining the guiding portion of the device are equidistantly spaced from the mandrel when the device is used to center the inflated tubing about the mandrel and the invention will be described in detail with reference to this particular embodiment. However, it should be understood that the spacing of these surfaces from the mandrel may be varied at will according to the desired position of the tubing with respect to the mandrel.

The inside wall of the advancing inflated tubing is engaged by the surfaces of the guiding portion of the pilot device and thereby urged into a position concentric to and spaced from the mandrel and into alignment with the shirring members immediately before entering the zone of shirring. Thus, the eccentric displacement of the tubing advancing on the mandrel due to drooping of the limp, softly inflated tubing is corrected. Moreover, the wall of the tubing is tensioned and shaped by passage of said tubing over the guiding portion of the device and the shirring members are thereby enabled to grip and pleat the tubing in a manner which results in an improved regular pleat pattern and an improved compression in the finished shirred casing stick.

In general, the flat width of a tubing within the same continuous length varies somewhat from a predetermined size. For example, tubing size manufacturing tolerances currently used are from 0.706 in. to 0.726 in. in diameter. Consequently, in a preferred embodiment of the pilot device of the invention, the guiding portion of said device is resilient. In this manner, the resilient surfaces of the guiding portion, when they engage the inside wall of the tubing, conform with the variations in the perimeter of the advancing tubing and maintain the wall of said tubing under tension and concentric with the mandrel without danger of tearing, puncturing or breaking said wall. The perimeter of this resilient guiding portion must be greater than the largest circumference of the tubing advancing thereover in order to have an effective positioning, shaping and guiding action on said tubing.

Referring now to the drawing, there is shown in FIG. 1 a shirring apparatus generally designated as 10. The apparatus 10 comprises a shirring mandrel 12 extending through a shirring head S. An inflated tubing 14 is fed onto the mandrel 12 by a pair of feed rolls 18 and a pair of cooperating feed belts 20. The shirring head S comprises a plurality of shirring wheels 16, through which the inflated tubing 14 passes and which shirr said tubing in a manner well known to those skilled in the art.

The pilot device of the invention, as shown in FIGS. 2 and 7, is positioned on the mandrel 12 at the entrance of the shirring passage formed by the shirring wheels 16. The advance of the loosely shirred casing on the mandrel 12 is retarded by a pair of holdback belts 22 to provide a more regular pleat formation in the shirred casing which may thereafter be successively compressed against a first clamp C and against a second clamp K in conventional manner and doffed from the shirring mandrel to be packed and shipped to the sausage manufacturers.

A preferred embodiment of the pilot device of the invention is illustrated in FIGS. 2 to 5. As above explained, the softly inflated collagen casing is particularly difficult to maintain in a position concentric to the mandrel as it advances into the shirring head S. In spite of various attempts to overcome this problem, such as the feed belts 20 shown in FIG. 1, the casing is so limp because of the low inflating pressure that it tends to droop and depend from the mandrel 12, as shown in FIG. 3, and to thus become eccentric with respect to the mandrel. In FIG. 2, fragmentary portions of the mandrel 12 and tubing 14 are shown to illustrate various stages of the shirring operation. The portion of the mandrel indicated by the line 3—3 is the feed end portion leading the casing towards the zone of shirring. The portion indicated by the lines 4—4 and 5—5 is the pilot portion and that indicated by line 6—6 is the shirring portion of the mandrel. The eccentrically dissplaced, inflated tubing 14, as shown in FIG. 3, advances towards the shirring head S and passes over the pilot device of the invention.

In the embodiment shown in FIG. 2, the pilot device comprises a mounting sleeve member 24 of a resilient material, a polyamide plastic material, or a rubber material, for example, and a plurality of identical spring arms 26, 28 and 30 (FIG. 5) equiangularly disposed around the mandrel at the 2 o'clock, 6 o'clock and 10 o'clock positions, respectively. Each spring arm has a first end portion obliquely anchored in the sleeve 24 and a second end portion bent in the direction of the mandrel 12 to be slidably received in a guide hole 15 in said mandrel whereby each spring arm forms a triangle with the mandrel surface. The perimeter circumscribed by the outermost end portion of the spring arms 26, 28 and 30 defines the guiding portion of the pilot device and is greater than the internal circumference of the inflated tubing 14. The outermost end portion of the spring arms is in a plane transverse to the axis of the mandrel 12 and preferably in a plane generally vertical to the mandrel. The inside wall of the advancing tubing is equiangularly supported by the three spring arms 26, 28 and 30 and gradually brought to a well centered position during its passage first over the sleeve 24 and then over the oblique portions of the spring arms 26, 28 and 30. The sleeve 24 preferably has a vertical modified triangular cross-section, as shown in FIG. 4, and each angular portion of the sleeve is so disposed as to receive the rear end of a spring arm portion anchored therein. The spring arms are preferably made of a spring wire or of any other suitable resilient, flexible material. Instead of being slidably mounted in the mandrel, the second end portion of the spring arms may be secured to the mandrel in any other convenient way, such as by soldering, for example. The manner in which the spring arms are mounted on the mandrel depends on the flexibility of the material from which the arms are made and on the degree of resiliency desired for the guiding portion of the pilot device.

After its passage over the pilot device, the now centered tubing advances and passes through the shirring wheels 16 of the shirring head S. For the purpose of illustration, the shirring head S is shown with three wheels (FIGS. 1 and 6) but it could as well have two or four or more wheels. Instead of being wheels, the shirring members could be belts, for example.

As illustrated in FIG. 6, the three wheels 16 of the shirring head S are equiangularly disposed around the mandrel at the 2 o'clock, 6 o'clock and 10 o'clock positions, respectively. The spring arms 26, 28 and 30 have been disposed in the same manner, as above explained. Thus, in this embodiment of the invention the softly inflated tubing advancing over the pilot device is urged into an approximately triangular conformation and the nodes of the triangular guiding portion of the pilot device center and align the nodes of the triangular cross-section of the tubing (FIG. 5), respectively, with the gripping arcuate surfaces of the shirring wheels 16.

Several modifications of the above-described embodiment of the pilot device are within the scope of the invention. For example, there could be four, five or more spring arms equiangularly disposed about the mandrel 12. The spring arms shown in FIGS. 2 and 5 may altogether be dispensed with and the triangular portion of the sleeve 24 will form the guiding portion of the pilot device. In this latter embodiment, the sleeve 24 is disposed adjacent the entrance of the shirring passage. The sleeve 24 may have a triangular vertical cross-section as shown in FIG. 4 or any other desired polygonal vertical cross-section.

A further embodiment of the invention is shown in FIGS. 7 and 8. The pilot device is formed of three sets of similar triangular fin-shaped members 32, 34 and 36 of a polyamide or other similar resilient material. These thin fin-shaped members are aligned on the mandrel 12 in tandem in spaced parallel relationship and they are of increasing height in the direction of advance of the tubing. The sets are disposed at the 2 o'clock, 6 o'clock and 10 o'clock positions, respectively, about the mandrel. While three sets of fins are shown in FIG. 8, a greater number of sets may be disposed about the mandrel. Also, the number of fin-shaped members in each set need not be limited to three.

Collagen casing, shirred by the three shirring wheels 16 of the shirring head S as shown in FIG. 6, after having passed over the above-described various embodiments of the pilot device of the invention, showed a greatly improved pleat pattern and compression factor.

The effectiveness of the pilot device of the invention will be illustrated by the following example.

EXAMPLE

A shirring apparatus as shown in FIG. 1 was used to shirr a continuous length of collagen tubing inflated with air at a pressure of 1 in. water column. The tubing had a nominal diameter of 0.713 in. The diameter of the mandrel at the zone of shirring was 0.540 in.

The shirring apparatus was provided with a pilot device as shown in FIG. 2. The arms of the guiding portion were made of spring wire having a diameter of 0.024 in. The length of each arm portion obliquely extending from the sleeve 24 to its outermost end was 1 in. and the angle of each arm with the mandrel was 8°. The sleeve 24 was made of nylon and had the following dimensions, at its triangular cross-section (see FIG. 4): from the center of the mandrel, the radius of the nodes was 0.313 in. The distance from the center of the mandrel to the flat side surfaces was 0.250 in.

After the shirring and compression steps, the resulting casing sticks had a very regular pleate pattern and the shirred wall of the sticks was concentric with the bore of said sticks.

The same shirring and compression steps were repeated under identical conditions but without the pilot device. The shirred wall of the resulting casing sticks was eccentric with the bore which was due to the drooping of the inflated tubing over the mandrel and to the eccentric displacement of said tubing when it entered the shirring zone. The eccentric displacement of the shirred wall of the stick with respect to the bore was of the order of 2 to 3. This displacement resulted in pleats of larger magnitude where the casing drooped and of correspondingly less magnitude in the diametrically opposite direction, i.e., the shirred wall on one side was about 1½ thicker than on the opposite side. These casing sticks were not commercially acceptable.

While the pilot device of the invention has been described with particular reference to the embodiments illustrated in FIGS. 2 to 5 and 7 and 8, respectively, several modifications of these embodiments are possible, as will be obvious to those skilled in the art. For example, the sleeve and spring arms shown in FIG. 2 could be replaced with an elongated, generally helicoidal spring member of increasing cross-section, in the direction of advance of the tubing, the mandrel 12 extending through said helicoidal spring member. Or, alternatively, the fins shown in FIGS. 7 and 8 could be replaced with a plurality of annular spring members aligned around the mandrel 12 and attached thereto in tandem in spaced parallel relationship with each other and of increasing diameter in the direction of advance of the tubing.

Furthermore, while the pilot device of the present invention is particularly useful in the shirring of a casing made of collagen and has been described in connection therewith, it should be well understood that the invention is not limited to such a use and that the pilot device may be employed in the shirring of any kind of tubing and casing. For example, it may be positioned on an apparatus for shirring a regenerated cellulose tubing, or a tubing made from alginates, polyvinyl acetate, or polyvinyl alcohol.

What is claimed is :

1. A method of shirring a tubular sausage casing, which comprises advancing a continuous length of inflated tubing over a shirring mandrel to and through a shirring zone, peripherally supporting an inner wall of the advancing inflated tubing at at least three points circumferentially spaced from each other and spaced from the mandrel in a plane transverse to the longitudinal axis of said mandrel, peripherally urging said inner wall in spaced apart relationship with respect to the circumference of said mandrel and internally guiding the tubing to a predetermined position with respect to the mandrel immediately before said tubing enters the shirring zone, and shirring the guided tubing.

2. A method as claimed in claim 1, in which the internally guided tubing is shaped into a predetermined polygonal conformation.

3. A method as claimed in claim 1, in which the inner wall of the advancing inflated tubing is peripherally supported at three points equidistantly spaced from each other and from the mandrel, said tubing is shaped into an approximately triangular conformation and the approximately triangularly shaped tubing is internally guided to a position concentric to the mandrel.

4. An apparatus for shirring a tubular sausage casing, which comprises a hollow shirring mandrel over which a continuous length of tubing passes, said mandrel being provided with means for inflating said tubing, a shirring head through which the mandrel extends and the inflated tubing advances, said mandrel having a tubing feed end and a tubing discharge end, a pilot device for the inflated tubing disposed on the mandrel between the feed end of said mandrel and the shirring head and in close proximity to said shirring head, said pilot device having a resilient guiding portion supporting the inside wall of the advancing inflated tubing at at least three points circumferentially spaced from each other and disposed in a plane transverse to the longitudinal axis of the mandrel, the perimeter of the resilient guiding portion being greater than the internal circumference of the inflated tubing advancing thereover.

5. An apparatus as claimed in claim 4, in which the supporting points are spaced equidistantly from the mandrel.

6. An apparatus as claimed in claim 4, in which the resilient guiding portion of the pilot device is a solid body having a polygonal cross-section and a central aperture through which the mandrel extends.

7. An apparatus as claimed in claim 6, in which the pilot device has a triangular cross-section.

8. An apparatus as claimed in claim 4, in which the pilot device comprises at least three spring arms, each one of said arms having a first end portion obliquely mounted in a sleeve member disposed around the mandrel upstream of the arms, and a second end portion bent in the direction of the mandrel and mounted therein, whereby each spring arm forms a triangle with the surface of said mandrel, the perimeter circumscribed by the outermost portion of said arms defining the guiding portion of said pilot device and being greater than the internal circumference of the inflated tubing.

9. An apparatus as claimed in claim 8, in which the sleeve member has a polygonal cross-section with a number of angular portions equal to the number of spring arms, an extremity of the first end portion of each of said arms being anchored in an angular portion of the sleeve.

10. An apparatus as claimed in claim 8, in which the triangles formed by the spring arms with the surface of the mandrel are all of equal dimensions and said arms are slidably mounted in the mandrel.

11. An apparatus as claimed in claim 4, in which the pilot device comprises a plurality of sets of triangular fin-shaped members of resilient material each set consisting of a plurality of said fin-shaped members, longitudinally aligned on the mandrel in spaced parallel relationship with respect to each other and of increasing height in the direction of advance of the casing.

12. An apparatus as claimed in claim 4, in which the shirring head comprises three shirring members equiangularly disposed around the mandrel and the pilot device comprises three spring arms equiangularly disposed around the mandrel, each of said arms having a first end portion obliquely mounted in a sleeve disposed around the mandrel upstream of the arms and a second end portion bent in the direction of the mandrel and mounted therein in close proximity to one of said shirring members, whereby each spring arm forms a triangle with the surface of said mandrel, said triangle being in alignment with one of the shirring members, the perimeter circumscribed by the outermost portion of said arms defining the guiding portion of said pilot device and being greater than the internal circumference of the inflated tubing.

References Cited
UNITED STATES PATENTS 3,315,300   4/1967   Ziolko _____ 17—42

HUGH R. CHAMBLEE, Primary Examiner

U.S. Cl. X.R.

17—42